April 29, 1947.   E. W. SMITH   2,419,603
APPARATUS FOR SUBMARINE SIGNALING
Filed Aug. 15, 1935   2 Sheets-Sheet 1
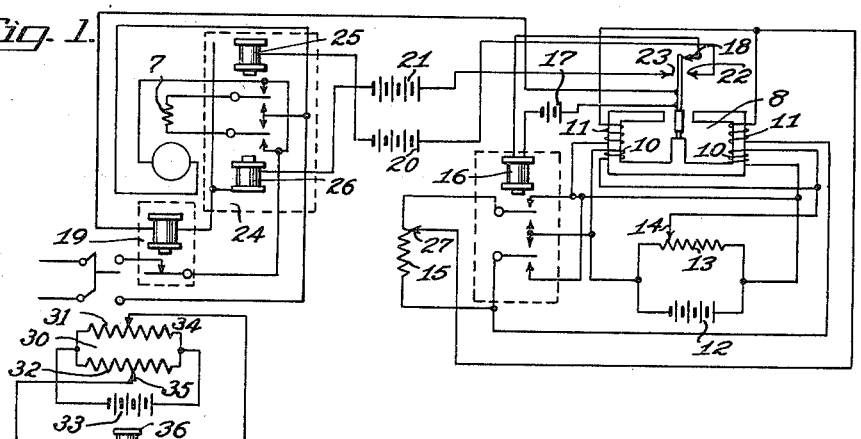
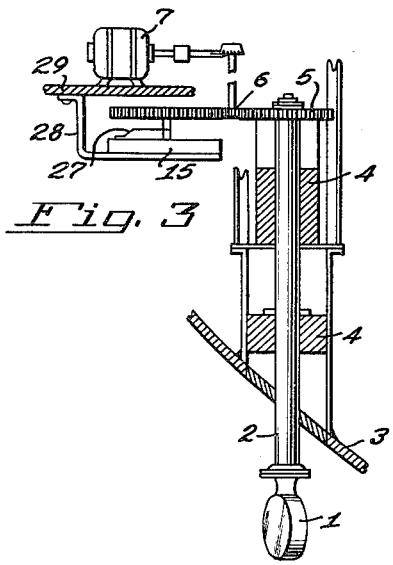
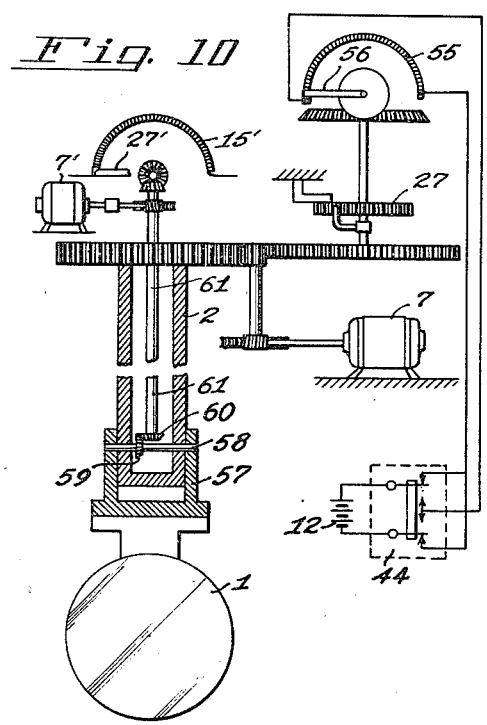
Inventor
EDWARD W. SMITH
By W. Glenn Jones
Attorney April 29, 1947. E. W. SMITH 2,419,603
APPARATUS FOR SUBMARINE SIGNALING
Filed Aug. 15, 1935 2 Sheets-Sheet 2
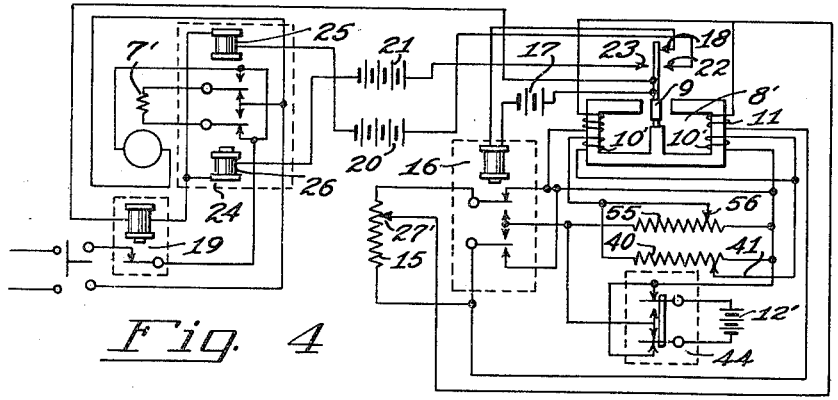
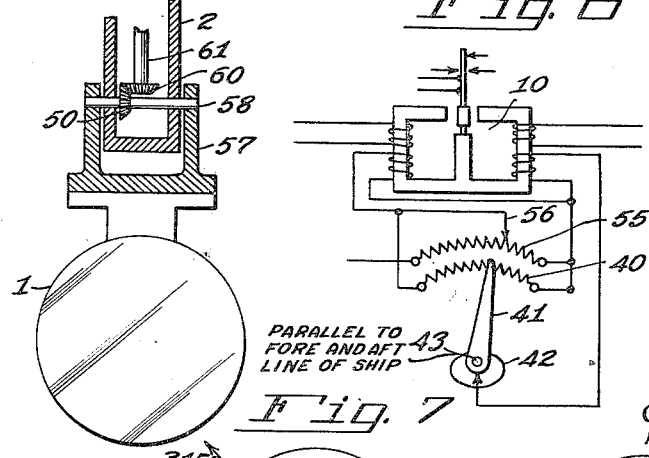
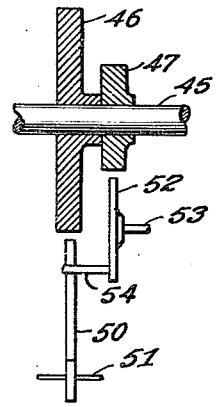
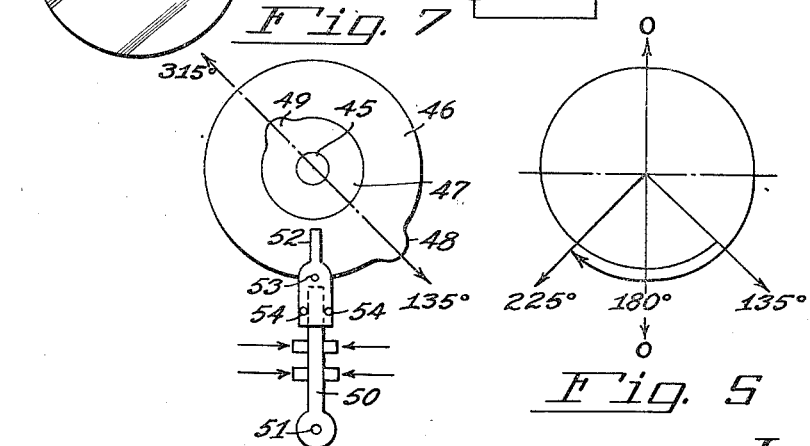
Inventor
EDWARD W. SMITH
By W. Glenn Jones
Attorney Patented Apr. 29, 1947

2,419,603

UNITED STATES PATENT OFFICE 2,419,603

APPARATUS FOR SUBMARINE SIGNALING

Edward W. Smith, Melrose, Mass., assignor to Submarine Signal Company, Boston, Mass., a corporation of Delaware Application August 15, 1935, Serial No. 36,353

9 Claims. (Cl. 181—0.5)

1

The present invention relates to an improvement in apparatus for submarine signaling and more particularly to the positioning of uni-directional underwater senders and receivers with respect to the direction of sending or receiving.

Uni-directional sending and receiving apparatus for compressional waves or other wave energy is frequently mounted on a ship in a tank adjacent to the skin of the vessel or is projected through the skin into the outer water. For many purposes, such as for echo ranging in which a signal is sent to a distant reflecting object and its echo is received, it is desirable to be able to rotate the sending and receiving device so that it will point in any desired direction. Since such apparatus is of necessity mounted near the bottom of the vessel, it is inconvenient to control it from this point, but it is desirable to be able to control the apparatus from a remote point on the vessel. It is an object of the present invention to provide an electrical control system for rotating an energy-transmitting and receiving device from a remote point.

Mechanical and hydraulic arrangements have heretofore been employed to rotate the sender or receiver but these have been expensive and oftentimes difficult to operate. According to the present invention a simple electrical control which is easy to operate is provided.

The present invention will be understood from the description taken in connection with the accompanying drawings in which Fig. 1 is a schematic wiring diagram of the electrical connections; Fig. 2 is a modification of a portion of the arrangement shown in Fig. 1; Fig. 3 is a schematic view of the mechanical cooperating arrangements; Fig. 4 is a modification of the invention for automatically keeping the submarine signaling device in a given position with respect to the vertical irrespective of rolling of the ship; Fig. 5 is a diagram showing amount of rotation required; Fig. 6 is a partial section through a pendulum and cam mechanism for operating one of the switches shown in Fig. 4; Fig. 7 is a front view of the device shown in Fig. 6; Fig. 8 is a schematic view of a pendulum-operated potentiometer forming part of the system shown in Fig. 4; Fig. 9 is a partial section of an arrangement for rotating the signaling device about an axis lying in a plane parallel to the ship's water line; and Fig. 10 shows a further arrangement partly diagrammatic illustrating combined operation for vertical and horizontal control of the signaling device.

As shown diagrammatically in Fig. 3 a directional underwater compressional wave sender or receiver 1 is fixed to a projectable tube 2 passing from the interior of a vessel through its skin indicated at 3. The tube 2 is rotatably mounted in bearings 4 the upper one of which is usually made watertight. At the top end of the tube 2 is a gear wheel 5 fixed meshing with a pinion gear 6 operated through suitable intermediate gearing by the electric motor 7. In order to control from a remote point the direction in which the diaphragm of the sender and receiver 1 faces, and in order to actuate the motor 7 to turn the sender or receiver 1 in the desired direction, the present invention provides the arrangement as shown in Fig. 1.

In Fig. 1 the operation of the motor 7 is controlled by a polarized relay 8. The armature 9 of the relay 8 is capable of assuming three positions depending upon the flux relations in the relay magnet cores. The relay 8 is provided with two sets of windings 10, 10, 11, 11. The two halves of winding 10 are connected in series and the combination is connected across the terminals of battery 12. Also across the terminals of battery 12 is a potentiometer 13 having the adjustable arm 14 which is connected to the junction of the two halves of winding 10.

The two halves of the winding 11 of the relay 8 are also connected in series and the combination is connected in series with the variable resistance 15 and with the battery 12 through the reversing relay 16. The reversing relay 16 is equivalent to a double-pole, double-throw switch which controls the direction of flow of current through the winding 11. The operating coil of relay 16 is connected to the battery 17 in series with the contact 18 of armature 9. This contact is closed when the armature is in its central position and when it has moved to the right, but is open when the armature moves to the left.

The operation of the motor is directly controlled by the relay 19 which opens and closes the power supply to the motor. The operating coil of relay 19 is connected to battery 20 or 21 through contacts 22 or 23 controlled by the armature 9. The direction of rotation of the motor 7 is directly controlled by the direction of current flow through its field winding which is determined by the position of the reversing relay 24. The relay 24 is provided with two operating coils 25 and 26 energized by the batteries 20 and 21 through the contacts 22 and 23, respectively. The contact arm 27 of the variable resistance 15 is arranged to be mechanically actuated by the shaft upon which the sender and receiver 1 is mounted, and consequently to take up a position corresponding to the position of the sender and receiver.

An arrangement for this purpose is schematically shown in Fig. 3 in which the resistance 15 is mounted by means of a bracket 28 fixed to the plate 29 which supports the motor 7. The contact arm 27 is rotated through suitable gearing by the tube 2. The gearing must be properly designed to produce a complete traverse of the arm 27 for the desired maximum number of degrees of rotation of the sender and receiver 1.

The contact arm 14 of the potentiometer 13 is conveniently arranged to be manually operated as by means of a handwheel to which a pointer may be attached cooperating with a scale graduated in degrees to indicate the position of the sender and receiver with respect to an arbitrary reference line such as the fore and aft line of the ship. In operating the arrangement described, the arm 14 is moved to the position as indicated by the pointer attached thereto. The flux through the two halves of winding 10 of the polarized relay 8 will consequently become unbalanced, thereby causing the armature 9 to move either to the right or the left. Assuming that the armature moves to the left, the contact 18 will be opened, thereby opening the circuit to the operating coil of relay 16 and causing the contacts of this relay to take the position opposite to that shown in Fig. 1, thereby reversing the direction of current flow through the winding 11 of the relay 8. The leftward movement of the armature 9, in addition to opening contact 18, closes contact 23, thereby energizing through the battery 21 the coil 26 of the relay 24 and at the same time energizing the operating coil of the relay 19, thereby closing power supply to the motor 7 which commences to rotate.

If the motor rotates the sender 1, the arm 27 of the variable resistance 15 likewise rotates. Initially when the arm 14 of the potentiometer 13 was displaced by the operator to a new position, the current in the winding 11 of the relay 8 was not such as to produce a flux which exactly opposed the flux produced by the winding 10. However, as the arm 27 is moved along the variable resistance 15 by the rotation of the sender 1, the current in winding 11 gradually assumes such values in the two halves of this winding that the flux produced will exactly oppose the flux produced by the winding 10. When this occurs, the armature 9 will return to its mean position and consequently the contact 23 will be opened, thereby opening the relay 19 and cutting off the power supply to the motor. If the displacement of the arm 14 is such as to cause the armature of the relay 8 to move to the right, an analogous operation will occur except that the motor 7 will rotate in the reverse direction.

Fig. 2 shows a modification of the arrangement shown in Fig. 1. As shown in Fig. 2 a Wheatstone bridge circuit is substituted for the polarized relay 8, the variable 15 and the potentiometer 13. The four arms of the bridge 30 are formed by two potentiometers 31 and 32 which are connected in parallel and the combination in parallel with the battery 33. The variable contact arms 34 and 35 connect to the potentiometers 31 and 32, respectively, and are connected to the winding of the polarized relay 36. The contact 34 is arranged to be manually displaced along the potentiometer resistance 31 in the manner similar to that described above with respect to the contact 14 in Fig. 1.

Similarly, the contact 35 is arranged to be operated by the rotation of the sender and receiver 1 in the manner similar to the operation above described of the contact 27 in Fig. 1. When the contact arms 34 and 35 are adjusted in corresponding position, the bridge is balanced and no current will flow through the operating coil of relay 36. On the other hand, when the arms 34 and 35 are in different relative positions, current will flow through the relay 36 in one direction or the other. In either event the contacts 37 will close, thereby closing the power supply to the motor 7. The contacts 37 correspond to the contacts of relay 19 in Fig. 1. The relay 36 also controls the armature 38 which may move in one direction to close the contact 39 or in the other direction to close the contact 40, depending upon the direction of flow of current through the coil 36. Contacts 39 and 40 thus correspond to contacts 22 and 23, respectively, of the relay 8 shown in Fig. 1. Otherwise the circuit is similar to that shown in Fig. 1. However, it will be noted that the relay 16 is not required and in place of the relays 8 and 19 a single simpler relay may be used, the two potentiometer resistances 31 and 32 serving to perform the work of the potentiometer 13, the resistance 15 and the relay 8 in Fig. 1.

From the above description it will be evident that my system provides a means for readily controlling by a simple manual adjustment the direction and extent of rotation of a device which is remote from the operator as well as one which may be too large for direct manual operation.

My system can also be applied to an arrangement for keeping the submarine signaling device directed in a given plane, e. g. a horizontal plane, irrespective of the roll of the supporting vessel. A modification of my system for this purpose is shown schematically in Fig. 4.

This arrangement is similar to that shown in Fig. 1. However, in place of the potentiometer 13, is a potentiometer 40, having the adjustable contact 41. The position of the latter is controlled by a pendulum in a simple manner such as is, for example, indicated schematically in Fig. 8. Here the potentiometer resistance 40 is semi-circular in form and is mounted rigidly on the ship in a plane transverse to the fore and aft line so that it extends an equal amount on each side of the vertical when the ship is on an even keel. A pendulum 42 carrying the contact 41 is mounted to swing freely on an axis 43 parallel to the fore and aft line of the ship. Thus, as the ship rolls, the resistance 40 will move to the right or the left while the pendulum will hold contact 41 in a vertical position. Consequently, the position of contact 41 on the resistance 40 will vary in proportion to the roll of the ship; and since the current through relay coils 10' is determined by the position of contact 41, the flux through the relay poles will vary in correspondence to the roll of the vessel. If closer control is desired, the resistance 40 can be tapered or the contact 41 operated through a cam so that the unbalance produced by the roll of the ship per degree of roll is varied in amount depending upon the total number of degrees of roll.

Now, as shown in Fig. 5, it is usually necessary to be able to rotate the signaling device through more than 360 degrees. For example, as illustrated in Fig. 5 it may be necessary to be able to rotate the device a total of 450 degrees. That is, if 0—0 represents a line parallel to the fore and aft line of the ship, it may be required to be able to rotate the signaling device from a position along the 135 degree line around a complete turn to a position along the 225 degree line. This makes necessary a special arrangement in order that the compensation for the roll of the ship be given the correct sense.

For this purpose the voltage impressed upon the potentiometer 40 by the battery 12' is automatically varied in direction by a reversing switch 44 controlled by a cam arrangement shown in Figs. 6 and 7. The shaft 45 is arranged to be rotated in any suitable manner by the signaling device supporting shaft 2 (Fig. 3). Mounted on the shaft are cams 46 and 47 having projections 48 and 49 thereon, respectively. The reversing switch 44 is provided with an arm 50, pivoted at 51, which is engaged by projection 48 and thrown in one direction or the other as the cam 46 turns. Another arm 52, pivoted at 53, and having pins 54 adapted to engage the arm 50, is operated by projection 49 of cam 47. Operation of arm 52 throws switch 44 into the opposite position from that obtained by direct actuation of arm 50 by cam 46 when moving in the same direction.

The projections 48 and 49 are exactly opposite each other, and if they are properly arranged with respect to the position of the signaling device 1, a reversal of the polarity of the connection of battery 12' to the potentiometer 40 will be obtained each time the diaphragm of the signaling device is perpendicular to the fore and aft line of the ship. This will produce a reversal of flux unbalance in relay 8' when the ship rolls and also cause a reversal of the action of motor 7' as explained with reference to Fig. 1. While it has been stated that it is often convenient to provide for a total of one and one-quarter revolutions of the signaling device in both directions, it will be evident that the reversing switch mechanism I have just described is sufficient for any number of revolutions as may be required.

The reversing switch 50 provides for compensatory movement of the signaling device in the proper direction to tend to keep its diaphragm in a vertical plane as the ship rolls regardless of the direction in which the diaphragm may have been turned with respect to the fore and after line of the ship. It also is necessary, however, to vary the amount of compensation for a given angle of roll in accordance with the position of the diaphragm. This is accomplished by varying the potential impressed across the potentiometer 40. To this end, battery 12' is connected through switch 44 directly across potentiometer 55 provided with movable contact 56 whose position is controlled by a cam geared to the shaft 2 in such a way that the voltage delivered by the potentiometer 55 to potentiometer 40 will be at a maximum when the axis of the projected sound beam is perpendicular to the center line of the ship, and will be at a minimum or zero when parallel to the center line of the ship.

The only other differences between the arrangement in Fig. 4 and that in Fig. 1 is that the contact 27' of resistance 15 in Fig. 4 is controlled by the angle which the diaphragm of the signaling device makes with its supporting shaft 2, and that the motor 7' is adapted to vary this angle.

The latter effect can be accomplished in the manner shown in Fig. 9. The signaling device 1 is here not fixed rigidly to the shaft 2, but is pivoted thereon by means of the U-shaped member 57 and the pin 58 fixed firmly to member 57. A gear wheel 59 meshes with gear 60, operated by the shaft 61 passing through the inside of shaft 2. Shaft 61 is geared in a suitable manner to the motor 7' and to contact 27'.

It will be evident that the modification of Fig. 2 can also be applied to the arrangement shown in Fig. 4. Moreover, the arrangement of Fig. 1 for rotating the device can be used in combination with the arrangement of Fig. 4 for keeping the signaling device in a given plane.

This arrangement is shown in Fig. 10 in which the circuits of Figs. 1 and 4 may both be applied to effect their respective controls of rotating the signaling device about a vertical axis and about a horizontal axis. In this arrangement as disclosed in connection with the description of Fig. 1, the motor 7 rotates through a proper reduction gearing system the shaft 5 from which depends the signaling device 1. This is the rotation of the signaling device about a vertical axis. Operating within the shaft 2, as indicated in Figs. 9 and 10, is the shaft 61 which is geared through the gear 60 to the shaft 58 upon which is fixed the free support 57 to which the oscillator 1 is mounted. Rotation of the shaft 61 by the motor 7' brings about a rotation of the oscillator 1 about the axis of the shaft 58. Geared to the shaft 61 is a rotating arm 27' for the potentiometer 15' which is diagrammatically illustrated in Fig. 4. The position of the arm 27' is controlled through the angular rotation of the oscillator 1 about a horizontal plane and brings about a balance of the position of the signaling device by equalizing the flux in the polarized relay 8'.

Furthermore, it will be understood that my system can be applied not only to submarine signaling apparatus as described, but also to other devices which it may be required to rotate or to keep in a prescribed position.

Having now described my invention, I claim:

1. A submarine signaling system including a vessel, a directional signaling device mounted thereon in a position normally for signaling along an axis in a horizontal plane when the ship is on an even keel, means for rotating said device and thereby rotating said axis in the signaling plane, additional means for rotating said device and thereby rotating said signaling plane, means responsive to rolling of the vessel adapted to actuate said second rotating means for restoring said device to approximately its normal position and means responsive to actuation of said first rotating means adapted to control the extent of response of said rolling responsive means in accordance with the amount by which said first rotating means has been actuated.

2. A submarine signalling device on a vessel having a directional sending and receiving device, mounting means for rotatably supporting the same on the vessel in a normally vertical plane when the vessel is on an even keel, means automatically determining when said device is out of a vertical plane by reason of the rolling of the vessel, and means responsive thereto for automatically returning said device in its normal position.

3. An acoustical apparatus, comprising in combination an acoustical instrumentality for transmitting or receiving sound energy, means which in a predetermined orientation supports the said instrumentality in a position normally to send or receive along a horizontal axis and means automatically determining when such orientation is changed, and means responsive to such change for continually automatically maintaining the said instrumentality in its normal position.

4. A submarine signaling system on a vessel having a directional sending and receiving device, mounting means for keeping said device in a position on the vessel to maintain the directive axis of said device substantially in a horizontal plane including a pendulum having electrical means automatically measuring the deviation of the vessel from the even keel position and means responsive to the action of said pendulum means during the deviation of the vessel from its even keel position for automatically maintaining said device with its directional axis horizontal during the changes of the vessel from its position on an even keel.

5. A submarine signaling system having a directional signaling device, mounting means for keeping said device in a position on a vessel to maintain the directive axis of said device substantially in a desired plane for directing the transmitted signaling wave thereof in a desired direction, means for varying the directive axis of said device with respect to said plane and a balanced arrangement having means controlled by its direction and extent of unbalance for effecting the direction and extent of variation of said directive axis of said device including means operable in accordance with the extent and direction of rolling of the vessel for producing a corresponding unbalance in said arrangement and means responsive to the changing of said directive axis of said device for reestablishing a balanced condition when the signaling device is returned to its normal position.

6. A signaling system on a vessel comprising, in combination, a rotatable shaft, a directive signaling element mounted on said shaft for rotation of its directive axis within a normally horizontal plane, means journaling said signaling element to said shaft for tilting said element in a direction fixed with respect to the rotational axis of said shaft and means controllable by the roll of the vessel and power means actuated thereby for tilting said signaling element to maintain its directive axis in a horizontal position for compensating for the roll of the vessel in all positions of said rotatable shaft.

7. A signaling system on a vessel comprising, in combination, a signaling device having a directive signaling axis, mounting means for said device adapted for rotation of said device about normally horizontal and normally vertical axes, control means and power means operated thereby for rotating said device about said normally horizontal axis and thereby maintaining said directive axis in a predetermined inclination to the horizontal for compensating for the roll of the vessel irrespective of the direction into which said device and its directive axis may have been rotated about said normally vertical axis.

8. A submarine signaling system on a vessel having a directional sending and receiving device, mounting means for keeping said device in a position on the vessel to maintain the directive axis of said device substantially in a horizontal plane and control means responsive to rolling of the vessel and positively actuated power means operated thereby including in part said mounting means for automatically maintaining said device with its directional axis horizontal during the changes of the vessel from its position on an even keel.

9. A signaling system on a vessel comprising, in combination, a rotatable shaft, a directive signaling element, means mounting said element on said shaft for rotation of its directive axis about a horizontal plane, control means responsive to deviations of the vessel from a normal horizontal plane and independent of said mounting means and power means actuated by said control means for independently maintaining said directive axis in said horizontal plane for compensating for the roll of the vessel.

EDWARD W. SMITH.

REFERENCES CITED

The following references are of record in the file of this patent:

UNITED STATES PATENTS

| Number | Name | Date |
|---|---|---|
| 786,024 | Gomborow | Mar. 28, 1905 |
| 1,002,567 | Davison | Sept. 5, 1911 |
| 1,086,729 | Rey | Feb. 10, 1914 |
| 1,472,558 | Fessenden et al. | Oct. 30, 1923 |
| 1,916,706 | Wittkuhns et al. | July 4, 1933 |
| 1,797,351 | Kunze | Mar. 24, 1931 |